United States Patent [19]

van de Kerkhof

[11] Patent Number: 4,561,178
[45] Date of Patent: Dec. 31, 1985

[54] APPARATUS FOR INSTALLING CONNECTORS ON FLAT CABLE HAVING AUTOMATIC CONNECTOR DELIVERY SYSTEM AND SELECTIVE ORIENTATION FEATURE FOR THE CONNECTORS

[75] Inventor: Lodevicus L. J. van de Kerkhof, 's-Hertogenbosch, Fed. Rep. of Germany

[73] Assignee: AMP Incorporated, Harrisburg, Pa.

[21] Appl. No.: 664,805

[22] Filed: Oct. 25, 1984

[51] Int. Cl.⁴ .............................................. B23P 19/00
[52] U.S. Cl. ......................................... 29/749; 29/759; 29/760
[58] Field of Search .......................... 29/749, 759, 760; 414/758, 222, 223

[56] References Cited

U.S. PATENT DOCUMENTS

3,358,852 12/1967 Fegley ...................................... 29/760
4,372,802 2/1983 Harigane et al. ...................... 29/759

Primary Examiner—Howard N. Goldberg
Assistant Examiner—Leonard S. Selman
Attorney, Agent, or Firm—Frederick W. Raring

[57] ABSTRACT

Apparatus for installing connectors on flat cables comprises an applicator having an application zone and a staging zone which is adjacent to the application zone. A turntable is provided in the staging zone which has a connector-receiving recess. Connectors are delivered to the recess and the turntable is rotated to align the connector with a guide track that extends to the application zone. Connectors can be selectively aligned in either of two possible orientations. The connectors are attached to an endless belt which is advanced during each cycle to deliver connectors to the turntable.

11 Claims, 16 Drawing Figures

APPARATUS FOR INSTALLING CONNECTORS ON FLAT CABLE HAVING AUTOMATIC CONNECTOR DELIVERY SYSTEM AND SELECTIVE ORIENTATION FEATURE FOR THE CONNECTORS

FIELD OF THE INVENTION

This invention relates to apparatus of the type which installs electrical connectors on flat conductor cables. The disclosed apparatus has a connector delivery system for feeding connectors to the application zone in either of two possible orientations for polarizing purposes.

BACKGROUND OF THE INVENTION

It is common practice to use flat conductor cables having a plurality of side-by-side coplanar conductors in an insulating sheath for making interconnections in many types of electrical devices such as computers and other complex electrical equipment. The connectors used for such flat cables are generally designed such that the connector can be installed on the cable by merely locating the cable in alignment with the terminals in the connector and pressing the cable into the wire-receiving slots of the terminals. A variety of machines are available for performing the operations of installing the connectors on the cable ranging from extremely simple machines to relatively complex machines which have feeding systems for feeding the connectors to an application zone and a press in the application zone for installing the connectors on the cables. Ordinarily, connectors are supplied to the user as loose piece items and, where the machine has a feeding means for feeding the connectors to the application zone, the loose piece connectors are stacked in a magazine and advanced, one at a time, into the application zone when the machine is operated.

The connectors of the type commonly used comprise an insulating housing having a rectangular cross section and having parallel sidewalls and parallel endwalls. It is possible to install an individual connector on a cable in either of two possible orientations and the particular orientation chosen will determine which conductors in the cable are connected to predetermined terminals in the connector. The cable will extend towards one of the elongated sidewalls of the housing with the end portions of the conductors connected to the terminals in the housing when the connector is in one of the two orientations and will extend towards the other (opposite) sidewall when the connector is in the other orientation. It is a desirable feature in applicators of this type that the applicator machine have the capability of installing the connector on the end of the cable in either of the two possible orientations. While some machines do have this capability, none of the presently available machines has this capability and, in addition, the capability of feeding the connectors from a reel which is wound on a belt. The presently available machines are designed such that they will accept only loose piece connectors.

The present invention is directed to the achievement of an improved applicator for installing connectors on the ends of flat cable which has an automatic feeding or delivery system for delivering the connector housings to the application zone of an applicator in either of the two possible orientations. The invention is further directed to the achievement of an applicator which has the above-mentioned orientation feature in combination with a feeding system for feeding connectors mounted on a belt towards the applicator and delivering the connectors in the desired orientation to the applicator.

THE INVENTION

The invention comprises an apparatus for installing electrical connectors on flat cables of the type having a plurality of conductors in side-by-side parallel relationship. The connectors are of the type comprising an insulating housing having oppositely directed faces, oppositely facing first and second sidewalls, and oppositely facing first and second endwalls, the endwalls and the sidewalls extending perpendicularly of the faces. The apparatus is of the type having an application zone, a housing applicator in the application zone for installing a housing in the application zone on a cable, a staging zone which is spaced from the application zone, and a housing guide track for guiding the housings from the staging zone into the application zone. A housing transporter is provided for moving the housings from the staging zone along the guide track and a housing delivery system is provided for delivering housings to the staging zone. The apparatus is characterized in that a turntable is provided in the staging zone which has first and second major surfaces and which has a circumferential cylindrical surface. A housing-receiving recess extends diametrically across the first major surface and has open first and second ends at the circumferential surface. The housing delivery system is effective serially to deliver housings to the housing-receiving recess with the first and second ends of the housing in the recess being adjacent to the first and second ends of the housing-receiving recess respectively. A turntable rotating means is provided for rotating the turntable through an angle of 180 degrees about an axis of rotation which extends centrally through the turntable whereby a housing delivered to the housing-receiving recess can be moved by the housing transporter along the guide track and into the application zone with the first endwall as the leading end or the second endwall of the housing as the leading end, thus to install the connector on a cable end in either of the two possible orientations.

In accordance with further aspects and embodiments, the housing delivery system comprises a static housing holder mounted adjacent to the first major surface of the turntable. The housing holder has holder sidewalls and holder endwalls which extend perpendicularly with respect to the first major surface. The housing holder extends diametrically with respect to the turntable and has an open bottom and an open top and is dimensioned to permit a housing to move therethrough beyond the open bottom so that upon placement of a housing in the holder, the housing will move into the housing-receiving recess when the recess is aligned with the housing holder. The apparatus may be intended for use with housings which are removably attached to a continuous belt, such as a tape, in parallel spaced-apart relationship with sidewalls of the housings extending transversely of the length of the belt. The apparatus would have a belt feeder for feeding the belt to the staging zone and to the housing holder so that the leading housing on the belt is fed to a position in which it is in alignment with the open top of the housing holder. A housing stripper is preferably provided for stripping the leading housing from the belt whereby the leading housing is moved into the housing holder.

In accordance with further embodiments, the turntable is rotatable between a loading position and an aligned position. The housing-receiving recess extends transversely of the guide track when the turntable is in the loading position and is aligned with the guide track when the turntable is in the aligned position, the turntable being rotatable selectively in a clockwise or in an anti-clockwise direction between the loading position and the aligned position. In accordance with a further embodiment, the turntable is rotatably adjustable through an adjustment angle of 90 degrees and is operationally rotatable through an operation angle of 90 degrees by the turntable rotating means. The orientation of the housings fed to the application zone is dependent upon the adjustment position of the turntable as determined by the adjusting means.

THE DISCLOSED EMBODIMENT

Figure 1:
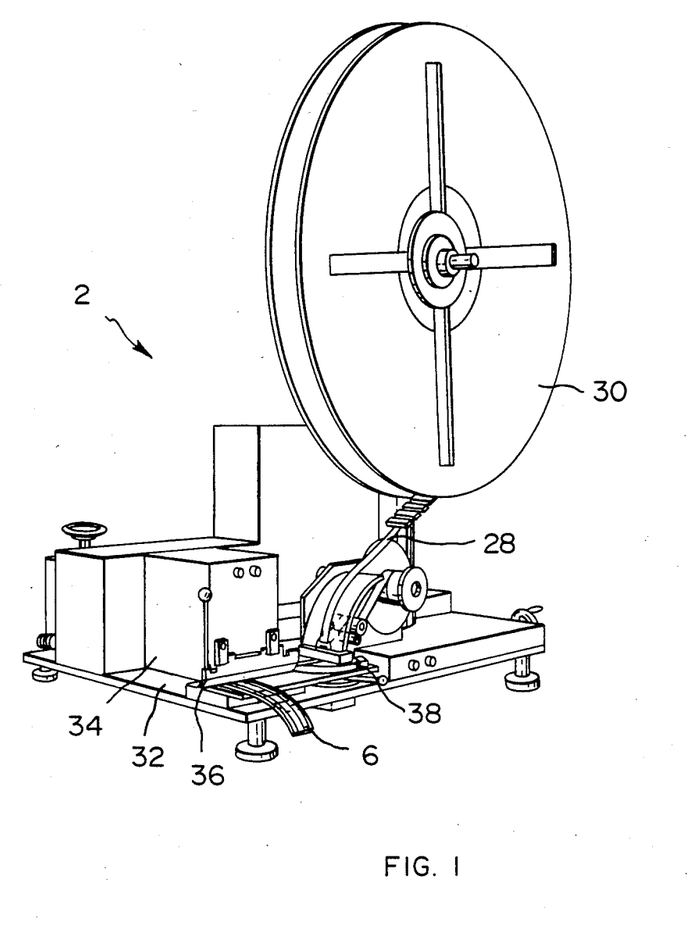
FIG. 1 is a perspective view of an apparatus in accordance with the invention.
Figure 2:
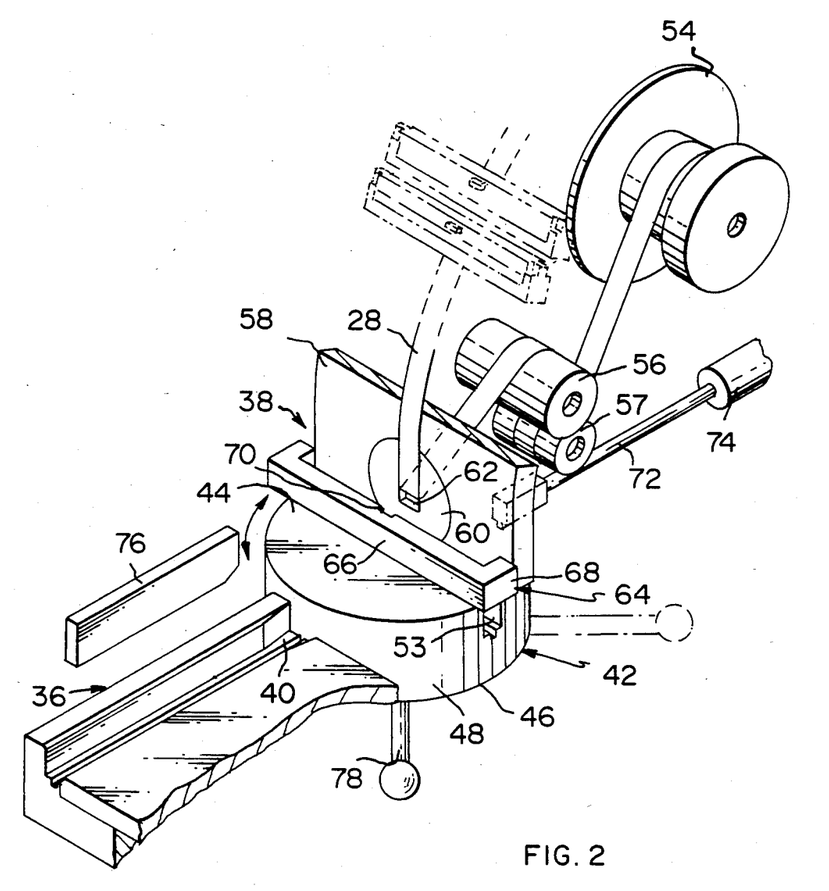
FIG. 2 is a fragmentary perspective view showing only the essential elements of the apparatus including features of the application zone, the staging zone, and the delivery system for delivering connectors to the staging zone.
Figure 15:
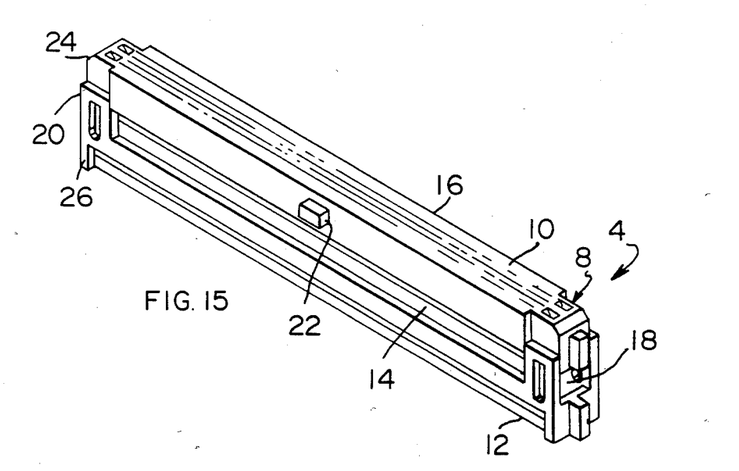
FIG. 15 is a perspective view of a representative type of electrical connector for flat cables.
Figure 16:
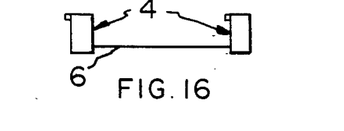
FIG. 16 is a side view of a section of cable having connectors as shown in FIG. 15 installed on its ends, one of the connectors being one of the possible orientations and the other connector being in the other possible orientation.

Referring first to FIGS. 1, 2 and 15, the apparatus 2 of the invention installs or applies connectors 4 on the ends of flat cables 6. Each cable comprises a plurality of conductors in side-by-side relationship in an insulating sheath or the like. Each connector 4 comprises an insulating housing 8 having oppositely directed first and second faces 10, 12, oppositely directed sidewalls 14, 16, and oppositely directed first and second endwalls 18, 20, the sidewalls and the endwalls being perpendicular with respect to the faces 10, 12. One of the sidewalls 14 has a centrally located polarizing boss 22 projecting therefrom. As shown in FIG. 16, this boss will project away from the end of the cable, as shown on the left, when the connector is in one of its two possible orientations and will project along the length of the cable or inwardly when the connector is in the other possible orientation.

The housing 8 of the connector 4 of the disclosed embodiment comprises two sections, a cover 24 and a lower main body 26. The cover is partially assembled to the main body and in installing the connector on a cable, the end of the cable is positioned between the cover and the upper surface of the main body. The cover is then moved downwardly into its fully assembled position, and in doing so, the individual conductors in the cable are inserted into slots in the terminals (not shown).

For convenience in storage, shipment, and handling, the connectors are removably secured to a belt or the like 28 and wound on a reel 30. In the disclosed embodiment, the belt comprises a continuous length of tape which is adhesive on one surface. The connectors are adhered to the surface and the sidewalls of the connectors extend transversely of the length of the tape.

The apparatus as shown in FIG. 1 comprises a base plate 32, an applicator 34 having an application zone 36, and a staging zone 38 which is spaced from the application zone. A guide track 40 (FIG. 2) extends from the staging zone and into the application zone for guiding connectors into the application zone with the sidewalls of the connectors extending parallel to their path of movement along the guide track.

The staging zone has a turntable 42 therein having first and second major surfaces 44, 46 and a cylindrical circumferential surface 48. A housing-receiving recess 50 extends diametrically across the upper or first major surface 44 and is dimensioned to receive a single connector housing. This recess has first and second open ends 52, 53 which open onto the circumferential surface 48.

The housing delivery system for delivering housings to the turntable comprises a wind-up spool 54 for the tape 28, guide rolls 56, 57 which guide the tape to the spool 54, and a guide plate 58 over which the tape is guided towards the upper surface of the turntable 42. The guide plate has a circular insert 60 therein in which there is provided an opening 62 through which the tape is advanced to the roll 56. Advantageously, this insert can be reversed and is provided with two or more openings so that tapes of varying widths can be used with the apparatus. When the wind-up spool 54 is rotated, a short length of tape is pulled from the reel 30 over the surface of the guide plate 58 and a connector is stripped from the tape as will be described below.

A housing holder 64 is mounted on the plate 58 immediately above the upper or first surface 44 of the turntable 42. This housing holder has a sidewall 66 and endwalls 68 which extend to the surface of the plate 58. The lower portion of this plate thus defines the other sidewall of the holder. The holder is open on its upper side and on its lower side and is dimensioned such that an individual housing can fall therethrough onto the turntable 42. A notch 70 is provided on the internal surface of sidewall 66 for reception of the boss 22 of the housing.

The individual housings are transported or fed from the staging zone to the application zone by a push rod 72 which extends from a pneumatic cylinder 74 and which is movable through the housing-receiving recess in the turntable. In the application zone, a force-applying member 76 is provided which can move downwardly and exert a force upon the cover portion of a housing to fully assemble the cover to the housing body as will be described below.

The operation of the apparatus will now be described with reference to FIGS. 2 to 6, and this description will be followed by a description of other and more specific structural features of the apparatus.

Figure 3:
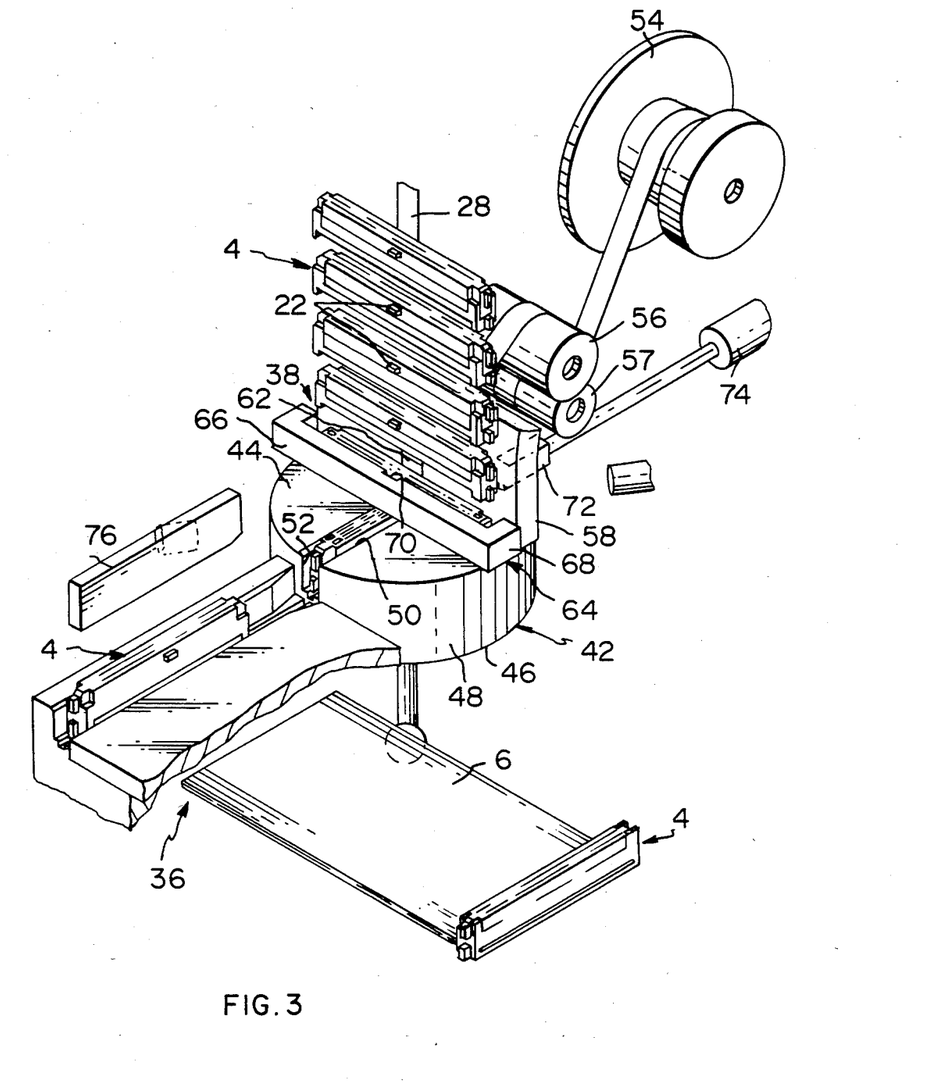
FIGS. 3 to 6 are views similar to FIG. 2 but showing the positions of the parts and the movement of the connectors during the various stages of an operating cycle of the apparatus.

The turntable can be rotated between the positions of FIGS. 2 and 3 and it will be assumed that at the beginning of the operating cycle, the parts are in the positions of FIG. 3. It will be noted that a connector housing 4 is positioned in the application zone 36, the housing-receiving recess 50 is in alignment with the guide track 40, a housing is in the housing-receiving recess, and another housing is resting in the housing holder 64. It is also assumed that the operator of the machine is about to insert the end of a cable 6 into the application zone and position the end between the cover and the main body of the connector which is in the application zone 36.

Figure 4:
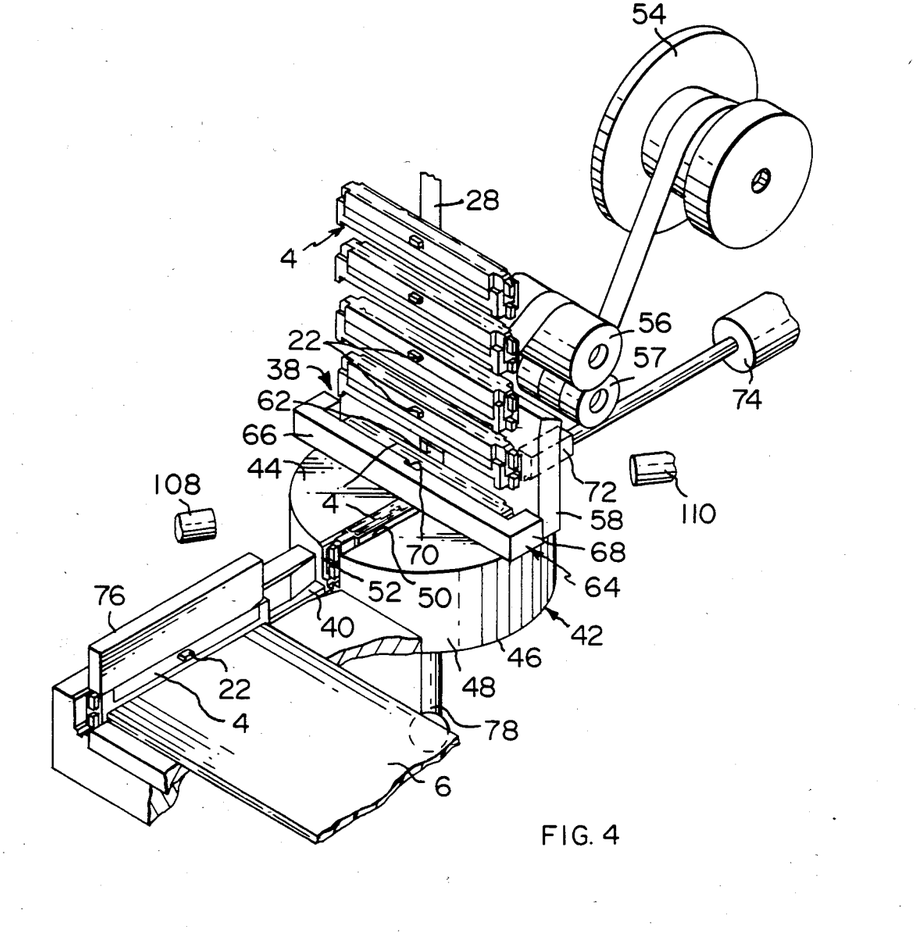
Figure 5:
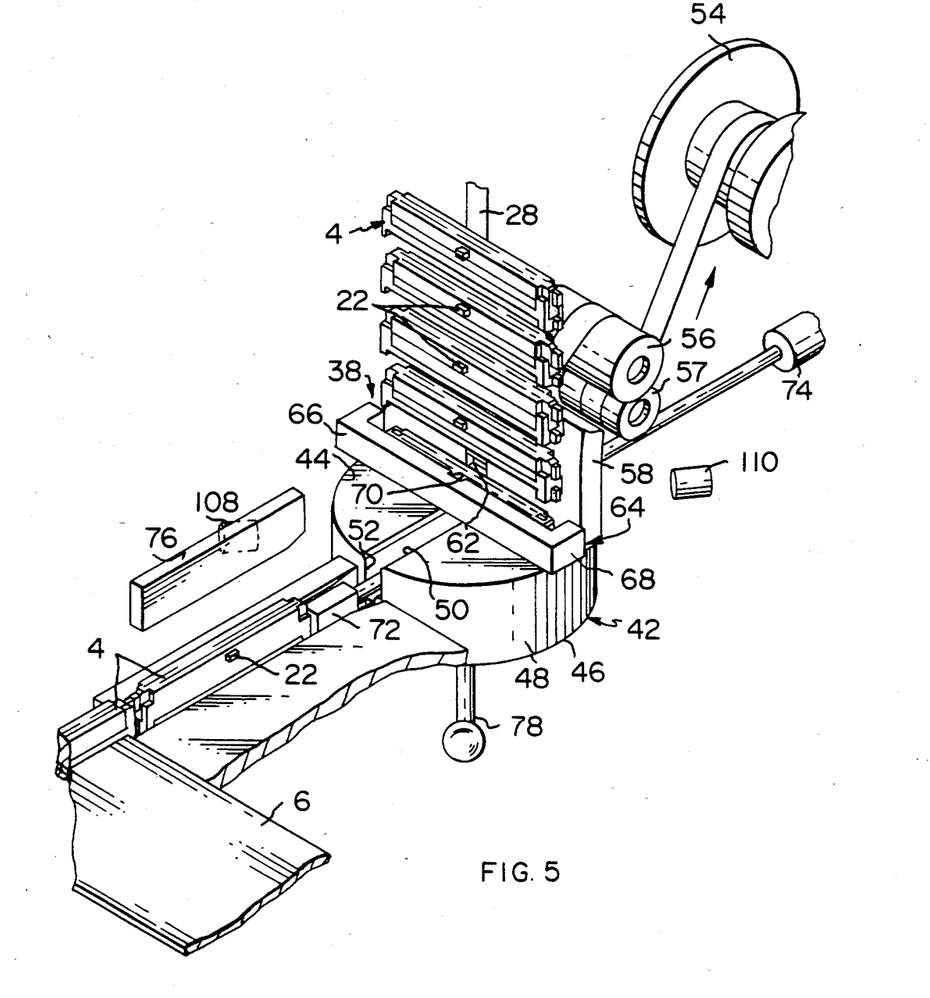

When the operator inserts the cable 6 into the connector, the control system for the apparatus, as described below, is set into motion and the force-applying member 76 moves downwardly from the position of FIG. 3 to the position of FIG. 4. The cover 24 is thereby moved to its fully assembled position and the connector is installed on the end of the cable 6. Immediately thereafter, the force-applying member 76 moves upwardly to its normal position, FIG. 5, and substantially simultaneously, the push rod 72 is advanced to push a connector from the recess 50 along the guide track 40 and into the application zone. The connector which is being pushed into the application zone also causes the other connector, which has been installed on the cable, to be ejected as shown in FIG. 5.

Figure 6:
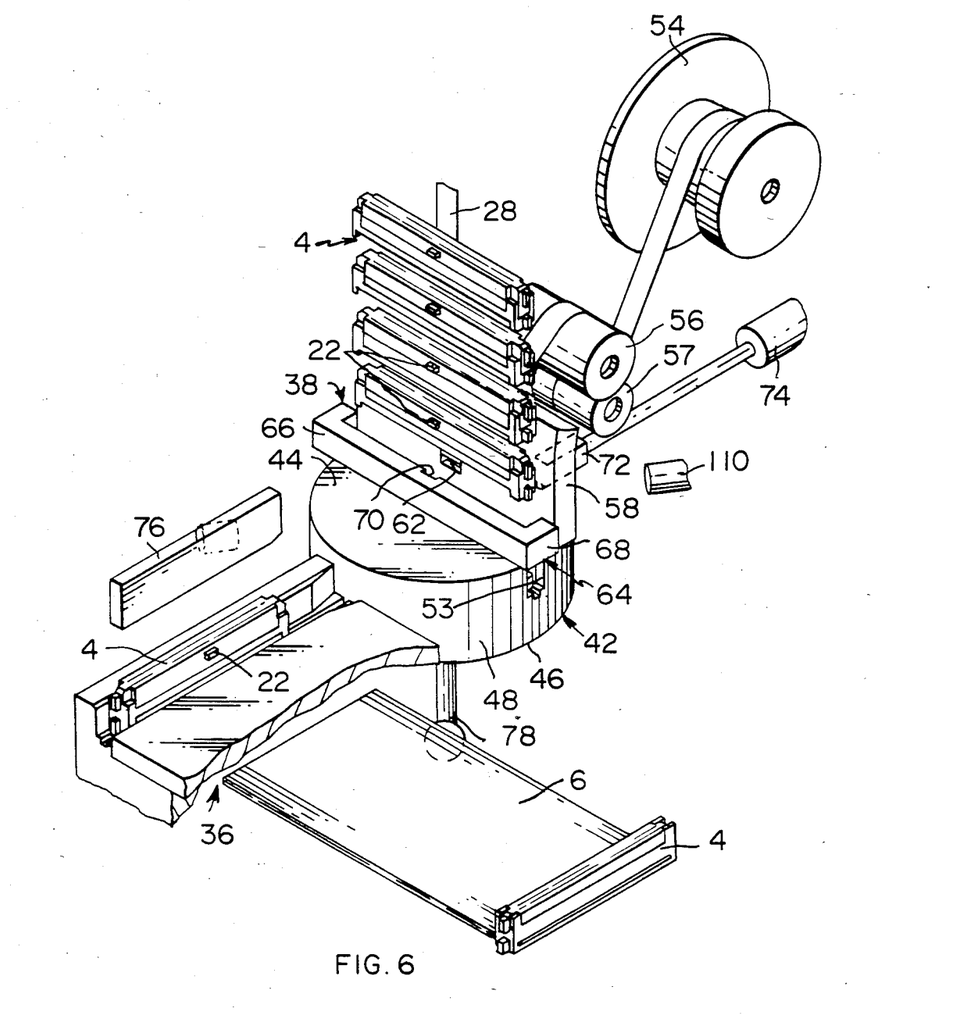

The cable pusher 72 immediately retracts to the position of FIG. 6 and the turntable is rotated in a clockwise direction to the position of FIG. 6 so that the housing-receiving recess 50 is beneath the housing holder 64. When the recess and the holder are in alignment, the housing which was previously in the holder drops down immediately into the recess and the turntable is then rotated in an anti-clockwise direction back to the position of FIG. 4. At this time, the belt 28 is fed by a small amount and the next or leading connector on the belt is moved downwardly towards the open upper end of the holder 64. As the sidewall of the connector moves past the opening 62, the leading connector is stripped from the belt and is deposited in the holder 64 in preparation for the next operating cycle. The operator is now free to insert the next cable into the application zone and repeat the entire cycle.

The apparatus can be operated in either of two operating modes to place the polarizing boss 22 on the cable entry sidewall of the connector or to have the polarizing boss extending away from the cable as shown in FIG. 16. In FIGS. 3 to 5, the operating mode is such that the polarizing boss will project toward the cable receiving side of the housing. If it is desired to have the connector installed in the other orientation so that the boss extends on the opposite side from the cable, an adjusting handle 78 is moved from the solid line position of FIG. 2 to the dotted line position thereby to adjust the position of the turntable 42 in a counterclockwise direction through an angle of 90 degrees. If this adjustment is made, the machine will be laced in its second operating mode and the resulting connectors on the cable ends will have their polarizing bosses located on the opposite side from the cable entry sidewall of the housing.

Figures 11, 12:
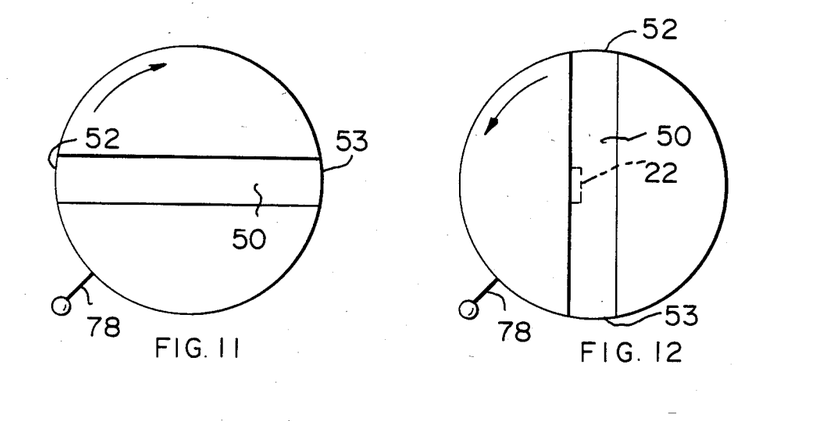
FIGS. 11 to 14 are diagrammatic views illustrating the manner in which the operating mode of the apparatus is changed.
Figure 13:
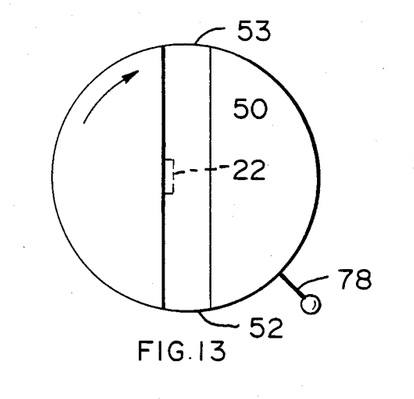

The manner in which the two operating modes are achieved can be understood from an inspection of FIGS. 11 to 14. FIGS. 11 and 12 illustrate the operation of the apparatus when it is in the operating mode described above and shown in FIGS. 3 to 6. In FIG. 11, the housing-receiving recess is in its aligned position relative to the guide track and it is rotated between the position of FIG. 11 and FIG. 12 during each operating cycle, the recess being shown in its housing-receiving position in FIG. 12. The position of the boss 22 of the connector is also indicated in FIGS. 12 and 13. The arrows indicate the direction of movement of the turntable from the positions shown.

Figure 14:
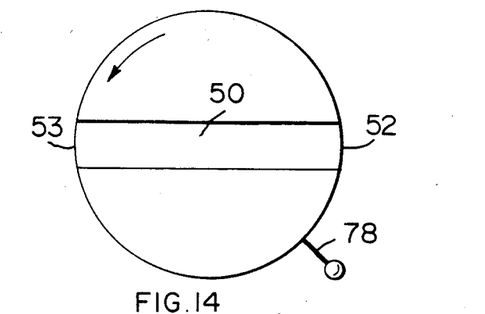

If the position of the turntable is adjusted in an anti-clockwise direction through an angle of 90 degrees from the position shown in FIG. 11, the housing-receiving recess 50 will be moved 90 degrees during the adjustment from the aligned position to the housing-receiving position. However, the rotary actuator (described below) is also moved through the 90 degree adjustment angle from the position of FIG. 11 to the position of FIG. 13. When the machine is subsequently operated, the turntable will be again rotated first in a clockwise direction from the position of FIG. 13 to the position of FIG. 14, and it will be seen that the position of the polarizing boss 22 on the connector which is fed to the application zone will now be on the opposite side of the feed track and the connector will be installed on the cable as shown by the connector on the left in FIG. 16.

The particular rotary actuator 85, which is briefly described below, used in the present embodiment of the invention is capable of only 90 degrees rotation in either a clockwise or anti-clockwise direction. Hence, the adjustment of the position of the turntable and of the actuator results in a reversal of the polarization of the connectors fed to the application zone as described above.

Figure 7:
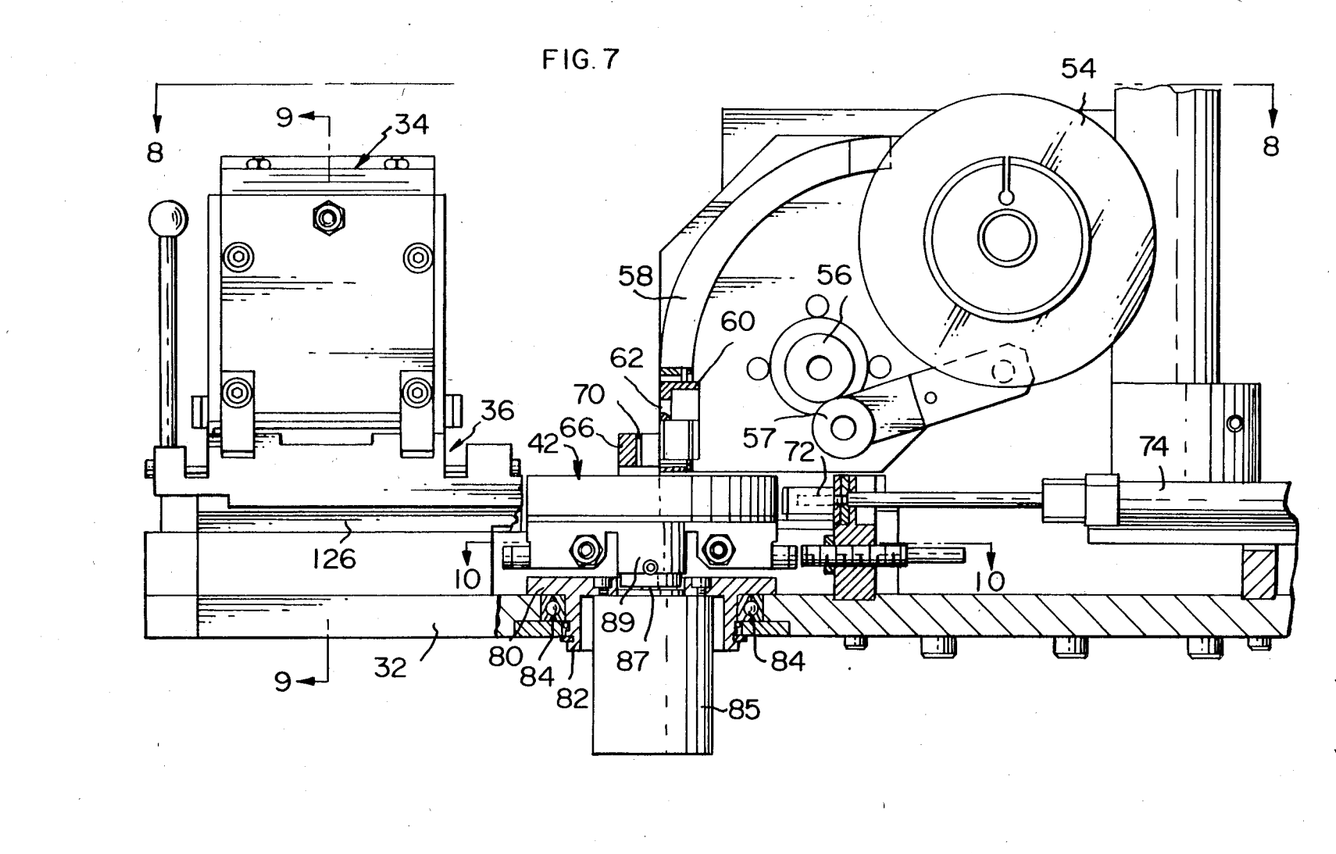
FIG. 7 is a frontal view, partly in section, showing the staging zone and the application zone and showing features of the delivery system for delivering connectors to the staging zone.
Figure 8:
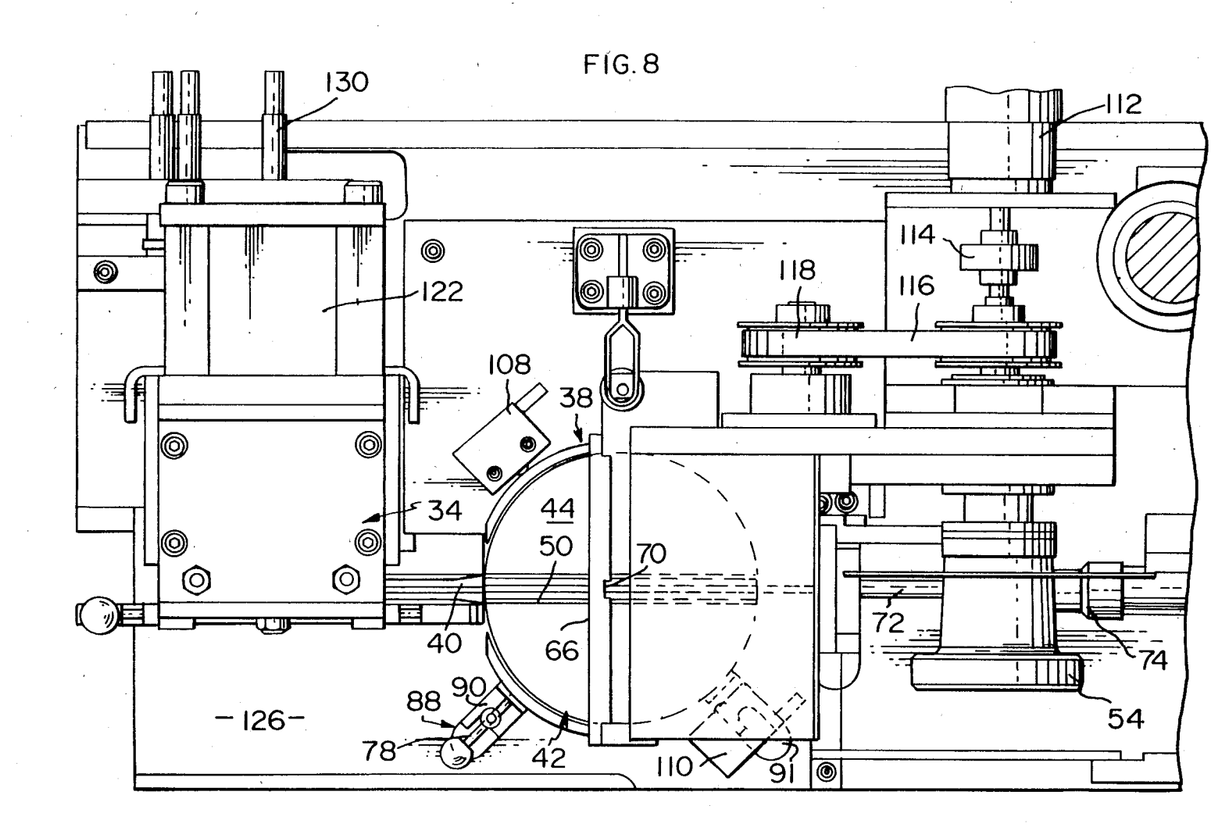
FIGS. 8, 9 and 10 are views looking direction of the arrows 8—8, 9—9, and 10—10 of FIG. 7.
Figure 10:
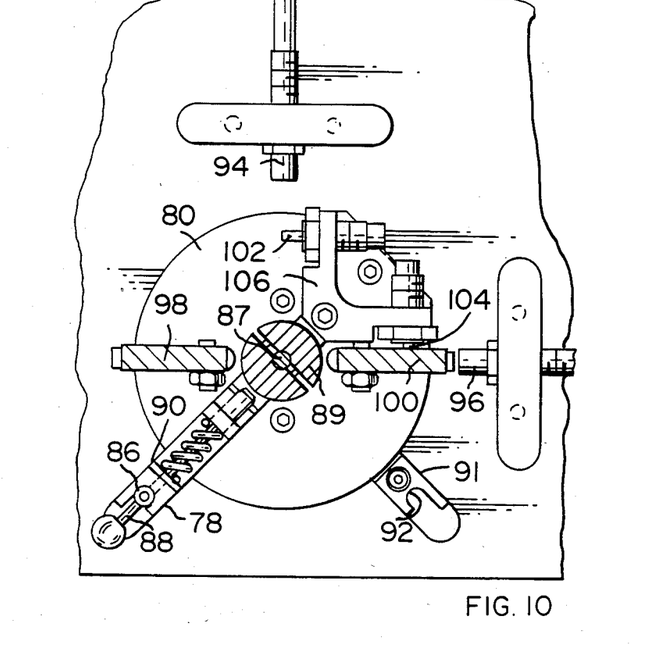

Referring now to FIGS. 7, 8 and 10, the turntable is mounted on a support 80 which is in turn mounted in the support 32 for rotational adjustment through the 90 degree angle discussed above. The support 80 has a depending cylindrical flange 82 which is supported by suitable bearings 84 in he support plate 32. The actuator 85 for rotating the turntable is mounted concentrically in the cylindrical flange 82 and has a shaft 87 that extends to the turntable and is coupled to the turntable by a coupling 89.

The arm 78 is latched in either of its two positions of adjustment by a latching mechanism which is cooperable with radially spaced-apart latching brackets 90, 91 on the surface of the plate 32. Each of these brackets has a recess 92 which receives a suitable spring-biased latching pin 86 on the arm. To move the turntable and the support 80, it is merely necessary to withdraw the pin from the pocket in the one bracket and to swing the entire assembly until it is stopped by the other bracket and the pin moves into the pocket 92 of the other bracket.

A variety of possible control systems can be provided for the apparatus. In the disclosed embodiment, proximity switches 94, 96 are provided on the plate 32 and these proximity switches are actuated by switch actuators 98, 100 which are circumferentially spaced apart by an angle of 180 degrees. These switches and their actuators can, for example, be light actuated. Referring to FIG. 10, it will be apparent that the actuator 100 is adjacent to the switch 96 and will, therefore, affect the condition of this switch. When the turntable is rotated through 90 degrees in a clockwise direction as viewed in FIG. 10, the actuator 98 will be placed adjacent to the switch 94. It should be mentioned that the actuators 98, 100 are on the underside of the turntable and rotate with the turntable while the other structure shown in FIG. 10 is mounted on the plate 32.

When the turntable is rotated, it must abruptly come to a stop in either of its two positions during each operating cycle. In order to dampen vibration, shock absorbers are provided as shown at 102, 104 on the upper surface of the support plate 80. These shock absorbers are carried by a bracket 106 and engage the side surfaces of the switch actuators 98, 100.

As shown in FIG. 8, a light detector system is advantageously provided for detecting the presence or absence of a connector in the housing holder 64. This detector comprises a light source and a light detector 108, 110 which are on opposite sides of the turntable and which are located such that the light beam will be directed over the surface of the turntable and across the housing-receiving recess. If a connector is located in the recess, the light beam will be interrupted and this signal is also used to control the overall operation of the apparatus.

The wind-up spool 54 for the tape 28 is advanced by a suitable actuator such as a motor 112 (FIG. 8) coupled through a slip clutch 114 to the spool. A number of arrangements are suitable for advancing the tape by the short amount required during each operating cycle. It is desirable to provide a positive drive to the reel 56 and this is done by means of a timing belt 116 which is coupled to a pulley 118 mounted on a shaft on which the roll 56 is also mounted.

Figure 9:
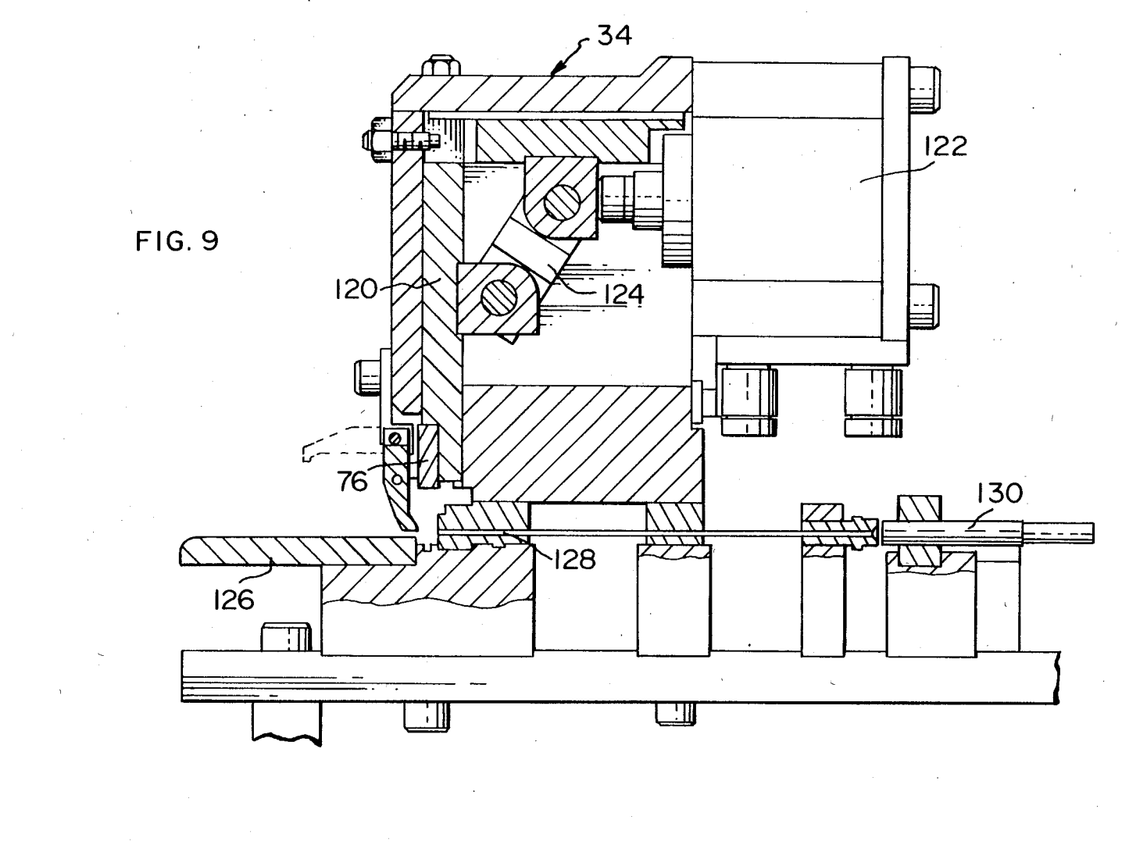

The applicator for installing the connector on the end of the cable may be of any type and the applicator shown in FIG. 9 is representative of a suitable type. The applicator has a housing in which there is provided a vertically reciprocable plate 120 having the previously identified pressure-applying member 76 thereon. Plate 120 is reciprocated during each operating cycle by a pneumatic piston-cylinder 122 which is coupled to the plate by a link 124. An apron 126 is provided in front of the application zone on which the cable is supported when it is inserted into the application zone. A hinged cover is provided for holding the connector in the zone as shown and the entire cycle can be initiated by a switch 130 which has a detector as shown at 128 adjacent to the applicator zone to detect the end of the cable when it is inserted through the partially assembled housing. The detector might take the form of a passageway for a light beam from the switch 130 or other detecting means.

Suitable circuitry can be provided in housings as shown on the plate 32 for controlling the sequence of operations of the apparatus in accordance with the specific requirements of a specific application. Additional detector switches can be provided as required.

A variety of alternative operating sequences can be used in the apparatus in accordance with the invention if desired. For example, the turntable can be normally aligned with the guide track and the connector delivery arranged to deliver connectors to the turntable in that position. During normal circumstances then, no rotation of the turntable would be required but rotation of 180 degrees would be required to change the operating mode.

The operation of the apparatus is as above described with reference to FIGS. 3 to 6 and need not be further described here. It will be apparent that the apparatus is capable of installing connectors on the ends of cables in either of the orientations which are required. It will further be seen that a delivery system for efficiently delivering connectors to the staging zone and to the application zone is provided and that the advantages of reel feeding and tape mounting of the connectors are obtained in the practice of the invention.

I claim:

1. Apparatus for installing electrical connectors on flat cables, the cables having a plurality of conductors in side-by-side parallel relationship, the connectors being of the type comprising an insulating housing having oppositely directed faces, oppositely facing first and second sidewalls, and oppositely facing first and second endwalls, the endwalls and the sidewalls extending perpendiculary of the faces, the apparatus being of the type having an application zone, a housing applicator in the application zone for installing a housing in the application zone on a cable which is presented to the application zone, a staging zone which is spaced from the application zone, a housing guide track for guiding the housings from the staging zone into the application zone with the housing sidewalls parallel to the guide track, a housing transporter for moving a housing from the staging zone along the guide track into the application zone, and a housing delivery system for delivering housings to the staging zone, the apparatus being characterized in that:

a turntable is provided in the staging zone, the turntable having first and second major surfaces and having a circumferential surface, a housing receiving recess extends diametrically across the first major surface and has open first and second ends at the circumferential surface, the housing delivery system being effective serially to deliver housing to the housing-receiving recess with the first and second ends of a housing in the housing-receiving recess being adjacent to the first and second ends of the housing-receiving recess respectively, a turntable rotating means is provided for rotating the turntable through an angle of 180 degrees about an axis of rotation which extends centrally through the turntable whereby, a housing delivered to the housing-receiving recess can be moved by the housing transporter along the guide track and into the application zone with the first endwall on the leading end or the secod endwall on the leading end of the housing.

2. Apparatus as set forth in claim 1 characterized in that the housing delivery system comprises a static housing holder mounted adjacent to the first major surface of the turntable, the housing holder having holder sidewalls and holder endwalls which extend perpendicularly with respect to the first major surface, the housing holder extending diametrically with respect to the turntable and having an open bottom and an open top and being dimensioned to permit a housing to move therethrough beyond the open bottom whereby upon placement of a housing in the housing holder, the housing will move into the housing-receiving recess when the recess is aligned with the housing holder.

3. Apparatus as set forth in claim 2 characterized in that the apparatus is intended for use with housings which re removably attached to a continuous belt in parallel spaced-apart relationship with the sidewalls of the housings extending transversely of the belt, the apparatus having a belt feeder for feeding the belt to the staging zone and to the housing holder so that the leading housing on the belt is fed to a position in which it is in alignment with the open top of the housing holder, and a housing stripper is provided for stripping the leading housing from the belt whereby the leading housing is moved into the housing holder.

4. Apparatus as set forth in claim 3 characterized in that the housing stripper comprises a guide plate having a bit-receiving opening therein, the belt-receiving opening being dimensioned to prohibit passage of the leading housing therethrough whereby upon feeding of the belt, the leading housing is stripped from the belt by the guide plate.

5. Apparatus as set forth in either of claims 1 or 4 characterized in that the turntable is rotatable between a loading position and an aligned position, the housing-receiving recess extending transversely of the guide track when the turntable is in the loading position and being aligned with the guide track when the turntable is in the aligned position, the turntable being rotatable selectively in a clockwise direction or in an anti-clockwise direction between the loading position and the aligned position.

6. Apparatus as set forth in claim 5 characterized in that the housing transporter comprises a push rod which is reciprocable along the guide track between a retracted position and an extended position while the housing is in alignment with the guide track.

7. Apparatus as set forth in claim 1 characterized in that the turntable is rotatably adjustable through an adjustment angle of 90 degrees and operationally rotatable through an operation angle of 90 degrees by the turntable rotating means.

8. Apparatus as set forth in claim 7 characterized in that the apparatus is intended for use with housings which are removably attached to a continuous belt in parallel spaced-apart relationship with the sidewalls of the housings extending transversely of the belt, the turntable being operationally rotatable between one position in which the housing-receiving recess is in alignment with the guide track and another position in which it is rotated substantially 90 degrees from the one position, the housing delivery system being effective to deliver housings to the staging zone and deposit housings, in the housing-receiving recess when the turntable is in the other position.

9. Apparatus as set forth in claim 8 characterized in that the turntable is mounted on a support which does not rotate when the turntable is rotated through its operation angle, the support being adjustable through the adjustment angle thereby to adjust the position of the turntable.

10. Apparatus as set forth in claim 9 characterized in that the turntable rotating means comprises a rotary activator provided on the support for rotating the turntable through the operation angle.

11. Apparatus as set forth in claim 10 characterized in that a control system is provided for advancing the belt feeder, rotating the turntable actuating the housing transporter and actuating the applicator.

* * * * *

UNITED STATES PATENT OFFICE
CERTIFICATE OF CORRECTION

Patent No. 4,561,178                Dated December 31, 1985

Inventor(s) Lodevicus L. J. van de Kerkhof

It is certified that error appears in the above-identified patent and that said Letters Patent are hereby corrected as shown below:

On the Cover of the Patent:

Section (75) should read: Lodevicus L. J. van de Kerkhof, 's-Hertogenbosch, The Netherlands.

In the Claims:

Claim 1, column 8, line 32, after "deliver", "housing" should be changed to ---housings---.

Claim 1, column 8, line 44, before "endwall", "secod" should be changed to ---second---.

Claim 3, column 8, line 61, after "which", "re" should be changed to ---are---.

UNITED STATES PATENT AND TRADEMARK OFFICE
CERTIFICATE OF CORRECTION

PATENT NO. : 4,561,178

DATED : December 31, 1985

INVENTOR(S) : Lodevicus L.J. van de Kerkhof

It is certified that error appears in the above-identified patent and that said Letters Patent is hereby corrected as shown below:

Claim 4, column 9, line 5, "bit-receiving" should be -- belt-receiving --.

Signed and Sealed this

Twenty-eighth Day of October, 1986

[SEAL]

*Attest:*

DONALD J. QUIGG

*Attesting Officer*  *Commissioner of Patents and Trademarks*